Dec. 12, 1961 C. V. WEBER 3,012,701
MEASURING DISPENSERS
Filed July 11, 1957 2 Sheets-Sheet 2
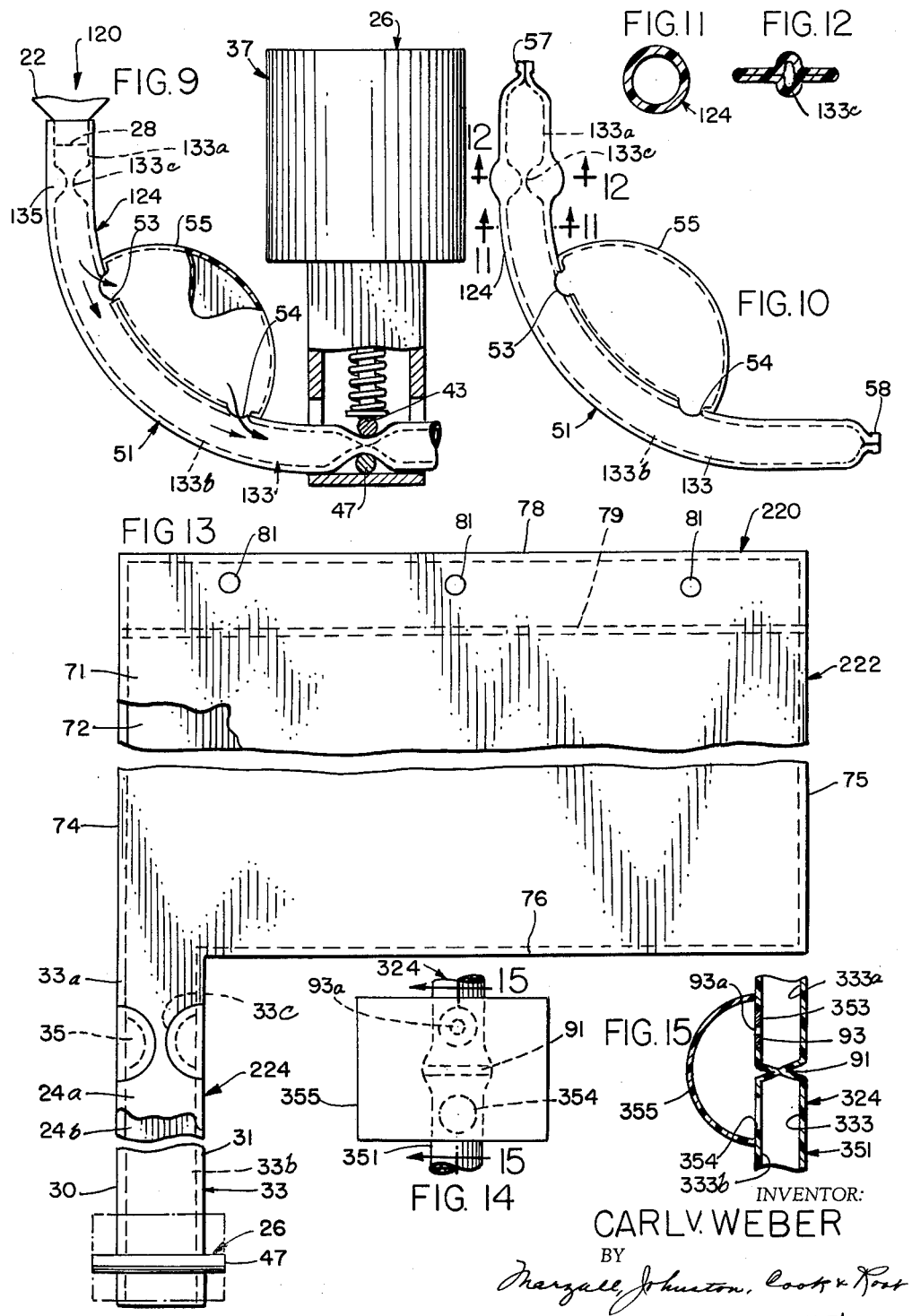
INVENTOR:
CARL V. WEBER
BY
Marzall, Johnston, Cook & Root
ATT'YS United States Patent Office 3,012,701
Patented Dec. 12, 1961

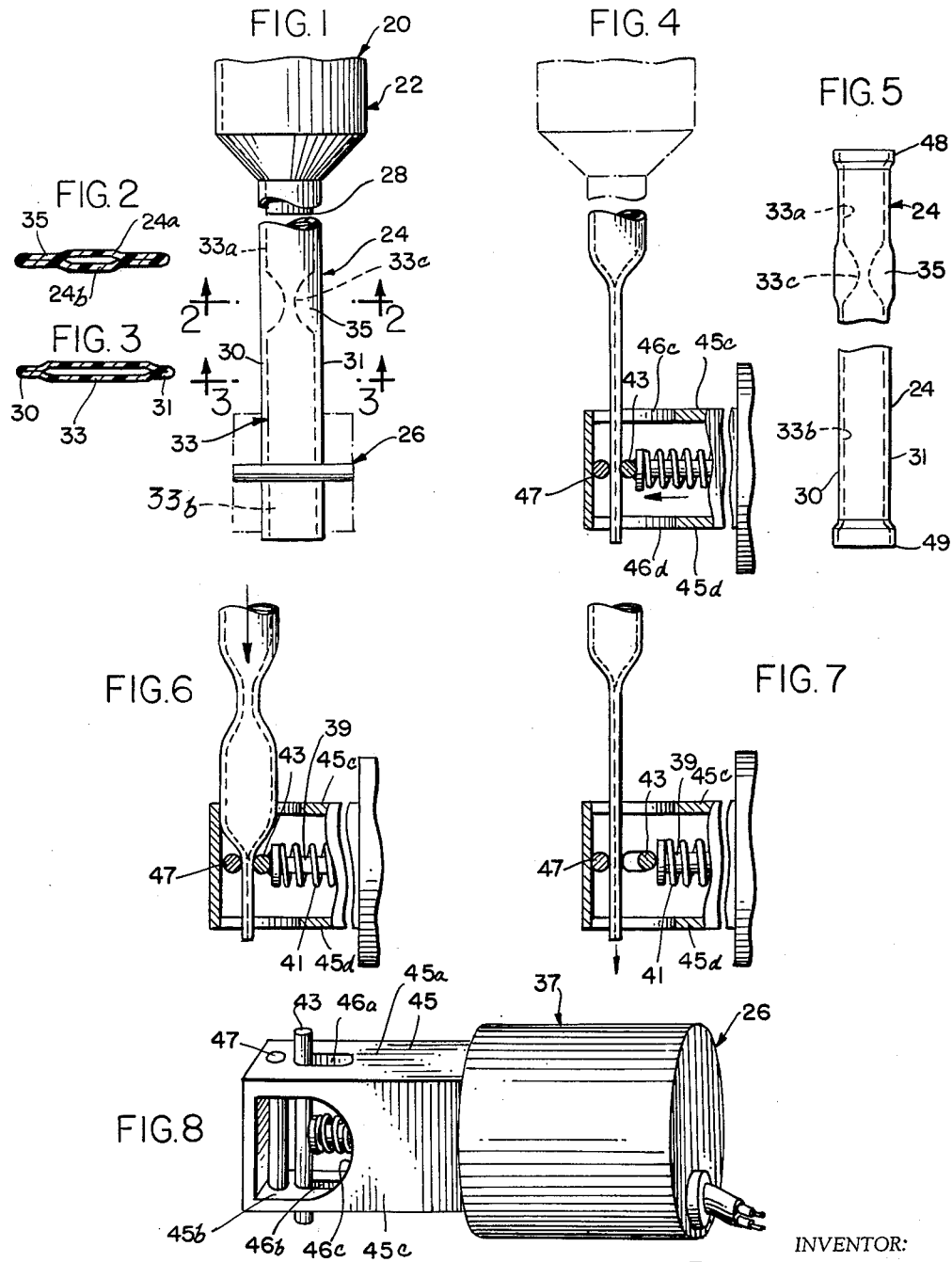

3,012,701
MEASURING DISPENSERS
Carl V. Weber, Chicago, Ill., assignor to Automatic Canteen Company of America, Chicago, Ill., a corporation of Delaware
Filed July 11, 1957, Ser. No. 671,158
6 Claims. (Cl. 222—449)

This invention relates to dispensers and more specifically to dispensers of the measuring type which are particularly well adapted for successively dispensing measured amounts, of liquids such as, for example, cream, milk, beverage syrups, or the like, from coin-operated vending machines, and the like.

It is a primary object of my invention to afford a novel dispenser which is operable to measure and dispense materials therefrom in a novel and expeditious manner.

Another object of my invention is to enable a dispenser to be provided with a novel measuring device constituted and arranged in a novel and expeditious manner.

Another object is to enable a novel dispenser for liquids to be afforded which embodies a novel discharge conduit affording a novel and practical measuring device.

When liquid flows by gravity only from a tank, or the like, through an outlet at the bottom of the tank, the rate of flow is directly affected by the head of liquid in the tank. This means, of course, that under such conditions, when the outlet is opened for a series of identical periods of time, the amount of liquid discharged from the tank during each successive period decreases as the level of the liquid in the tank becomes lower. This creates a problem in certain liquid dispensing devices such as, for example, in coin-operated beverage vending machines, wherein it is desired to dispense the same measured amount of liquid such as cream, milk, beverage syrup, and the like, during each complete cycle of operation of the machine. It is an important object of my invention to enable identical predetermined amounts of liquid to be discharged by gravity from such a tank, or the like, in successive identical periods of time in a novel and expeditious manner.

Another object is to afford a novel measuring device which may be used as a constant-head discharge unit for constant viscosity liquids in conjunction with a timed orifice which is opened for the same period of time during each cycle of operation.

Yet another object of my invention is to insure the sanitary condition of discharge conduits for cream, milk, beverage syrups, and the like, used in vending machines, and the like.

An object ancillary to the foregoing is to afford a novel combination discharge conduit and measuring device which is cetrain to be in sanitary condition at the time it is placed in operative position in a vending machine, or the like.

A further object is to afford a novel combination discharge conduit and measuring device, which may constitute a disposable unit when used with perishable liquids such as milk and cream, and which may constitute a reusable unit when used with relatively non-perishable liquids such as beverage syrups, and the like.

Another object of my invention is to afford such a novel measuring device which may be quickly and easily mounted on or removed from a storage receptacle for cream, milk, beverage syrups, or the like.

Another object is to afford a measuring device of the aforementioned type which may be maintained hermetically sealed against the entrance of foreign material thereinto until it is desired to use it as a discharge conduit for a cream dispenser, or the like.

Yet another object of my invention is to afford a novel measuring device of the aforementioned type which may be constructed of flexible sheet material in a novel and expeditious manner.

Another object is to enable a novel combination discharge conduit and measuring device to be produced as a low-cost, sanitary, transparent item from transparent plastic sheet and tube materials.

A further object is to enable the storage receptacle and a novel combination discharge conduit and measuring device of a cream dispenser, or the like, to be constructed as a unit from flexible sheet material in a novel and expeditious manner.

An object ancillary to the foregoing is to afford a novel unitary device of the aforementioned type, which may be filled with cream, or other material to be dispensed, and may then be hermetically sealed until such time as it is desired to place the cream or other material in a vending machine to be dispensed therefrom, and at which time the unitary device may be quickly and easily placed in the vending machine as a unit to afford the storage receptacle, discharge conduit, and measuring device for such cream, or the like, for dispensing such cream, or the like, from the machine in equal successive "charges."

Another object of my invention is to afford a novel measuring device of the aforementioned type which is effective and efficient in operation, and which may be readily and economically produced commercially.

Other and further objects of the present invention will be apparent from the following description and claims, and are illustrated in the accompanying drawings, which, by way of illustration, show the preferred embodiments of the present invention and the principles thereof and which I now consider to be the best modes in which I have contemplated applying these principles. Other embodiments of the invention embodying the same or equivalent principles may be used and structural changes may be made as desired by those skilled in the art without departing from the present invention.

In the drawings:

FIG. 1 is a fragmentary front elevational view of a dispenser embodying the principles of my invention;

FIG. 2 is an enlarged detail sectional view taken substantially along the line 2—2 in FIG 1;

FIG. 3 is an enlarged detail sectional view taken substantially along the line 3—3 in FIG. 1;

FIG. 4 is a fragmentary side elevational view, partly in section, of the dispenser shown in FIG. 1;

FIG. 5 is a fragmentary front elevational view of the novel discharge conduit and measuring device, shown in FIG. 1, before it is mounted in operative position in a dispenser;

FIGS. 6 and 7 are views somewhat similar to FIG. 4, but showing certain parts in different operative positions;

FIG. 8 is a perspective view of the control device shown in FIG. 4;

FIG. 9 is a side elevational view of a dispenser embodying a modified form of my novel measuring device;

FIG. 10 is a side elevational view of the measuring device shown in FIG. 9 prior to being embodied in a dispenser;

FIG. 11 is an enlarged detail sectional view taken substantially along the line 11—11 in FIG. 10;

FIG. 12 is an enlarged detail sectional view taken substantially along the line 12—12 in FIG. 10;

FIG. 13 is a side elevational view of another modified form of my novel dispenser;

FIG. 14 is a fragmentary elevational view of another modified form of my invention; and FIG. 15 is a detail sectional view taken substantially along the line 15—15 in FIG. 14.

A dispenser 20, embodying the principles of my invention, is shown in FIGS. 1 to 8, inclusive, of the drawings to illustrate the preferred embodiment of my invention.

The dispenser 20 is of a type which is particularly well adapted for use in coin-operated vending machines, and the like, wherein it is necessary that a relatively carefully controlled amount of cream, or the like, is dispensed in each operation of the machine.

It will be appreciated by those skilled in the art that although my novel dispenser is herein described as dispensing cream, that this is merely by way of illustration, and not by way of limitation, and that it may be used for dispensing other suitable material, such as, for example, milk, beverage syrups, and the like, without departing from the purview of my invention.

The dispenser 20 embodies, in general, FIGS. 1, 4 and 8, a storage receptacle or tank 22, a combination discharge conduit and measuring device 24 connected to the bottom of the tank 22, and a control device 26 for controlling the flow of material from the measuring device 24, and therefore from the tank 22.

The tank 22 may be made of any suitable material, such as, for example, stainless steel, or the like, and includes a discharge nipple or pipe 28, projecting from the bottom thereof, FIG. 1.

The combination discharge conduit and measuring device 24 is preferably made of suitable thermoplastic sheet material, such as, for example, thermoplastic resinous material such as polyethylene resin, or the like, and preferably embodies two elongated sheets 24a and 24b, of such material disposed in juxtaposition to each other and heat sealed to each other along their opposite longitudinal edge portions 30 and 31, FIGS. 1 and 3, to thereby afford a tubular conduit, the walls of which are normally disposed in substantially flat, collapsed position when the conduit is not filled with material to be discharged.

The measuring device 24 has a passageway 33 extending longitudinally therethrough. The upper end portion 33a and the lower end portion 33b of the passageway 33 are relatively large in cross section and are preferably of the same cross sectional size. The portion 33c of the passageway 33 disposed between the upper and lower portions 33a and 33b, respectively, is of reduced size, the sheets 24a and 24b being heat sealed together for a distance inwardly from the longitudinal edge portions 30 and 31 to thereby form a restriction 35 in the passageway 33 between the upper and lower end portions 33a and 33b, respectively, FIGS. 1 and 2.

The control device 26, FIGS. 4 and 8, embodies a solenoid 37 which includes a plunger 39 which is urged outwardly by a compression coil spring 41 mounted thereon. A substantially straight elongated bar 43, FIGS. 4, 7 and 8, is mounted on the outer end of the plunger 39 in substantially transversely extending relation thereto and may be suitably secured thereto, such as, for example, by welding.

A housing 45, having four side walls 45a, 45b, 45c, and 45d, is mounted on one end of the solenoid 37 and projects outwardly therefrom in enclosing relation to the free end portion of the plunger 39. Two elongated slots 46a and 46b are formed in the opposite side walls 45a and 45b, respectively, of the housing 45, in substantially parallel relation to each other and to the plunger 39, FIG. 8, and the opposite end portions of the rod 43 are slidably mounted in and project outwardly through the slots 46a and 46b. Another elongated rod 47 extends between, and is fixedly secured in the walls 45a and 45b outwardly of, and in parallel relation to, the rod 43, for a purpose which will be discussed in greater detail presently.

Two enlarged openings 46c and 46d are formed in the other opposite side walls 45c and 45d, respectively, of the housing 45, FIGS. 4 and 8. The openings 46c and 46d are of such size as to permit the insertion of the lower end portion of the conduit and measuring device 24 freely therethrough, and, when the control device 26 is mounted in operative position in a vending machine in which my novel dispenser 20 is to be used, the control device 26 may be mounted below the tank 22 in such position that the lower end portion of the measuring device 24 extends downwardly through the openings 46c and 46d, between the bars 43 and 47, FIGS. 4 and 7. To do this, the plunger 39 of the solenoid 37 may be retracted to thus separate the bars 43 and 47, as shown in FIG. 7.

The bars 43 and 47 are so disposed relative to each other that when the bar 43 is disposed in full outward position in the slots 46a and 46b, FIGS. 4 and 6, the lower end portion of the measuring device 24 is effectively clamped beween the bars 43 and 47 to thereby close the passageway 33 at that point and prevent the flow of cream, or the like, past the clamped portion. The solenoid 37 is normally de-energized and, when it is in this condition, the plunger 39 occupies the full forward position shown in FIGS. 4 and 6 and, therefore, when the lower end portion of the measuring device 24 is disposed between the bars 43 and 47, the passageway 33 is normally effectively closed by the control device 26. However, when the solenoid 37 is energized, the plunger 39 is moved inwardly into retracted position, as shown in FIG. 7, to thereby move the bar 43 away from the bar 47 and out of clamping engagement with the lower end portion of the measuring device 24. This is effective to permit the lower end portion of the passageway to open and discharge material through the lower end of the measuring device 24, as will be discussed in greater detail presently.

In the manufacture of my novel measuring device 24, the interior thereof may be sterilized and the ends thereof may be suitably sealed such as, for example, by heat sealing the end edges 48 and 49 thereof, as shown in FIG. 5. To insure that the interior of the measuring device 24 remains sterile, the ends 48 and 49 can be kept sealed until just before the measuring device 24 is used. Thus, for example, a service man for vending machines, or the like, can carry a supply of the sealed measuring devices 24 with him, and, when it is desired to install one in a vending machine, the ends of the measuring device may then be cut off, in the field, adjacent to, but inwardly of, the sealed end edges 48 and 49, and the measuring device 24 immediately installed in the machine.

When the measuring device 24 is to be used on a tank or container which is normally replaced, rather than refilled, such as, for example, tanks used in the dispensing of milk, cream, and the like, from coin-operated vending machines, the sealed end edge 48 may be cut off, and the upper end of the measuring device 24 may be mounted on the tank at the dairy. Then, after the serviceman has installed the new tank in the vending machine, and has inserted the lower end of the measuring device 24 into clamped position between the bars 43 and 47 of the control device 26, he may cut off the lower sealed edge 49 of the measuring device 24.

No matter which of the two above mentioned procedures is followed in installing my novel measuring device 24, it will be seen that the sanitary condition thereof may be insured.

In the operation of my novel dispenser 20 shown in FIGS. 1 to 8, inclusive, of the drawings, the end edges 48 and 49 may be cut off from the measuring device 24, and the upper end of the thus opened combination discharge conduit and measuring device 24 may be mounted on the discharge nipple 28 of the storage tank or receptacle 22 in a vending machine, or the like. The lower end portion of the measuring device 24 may then be extended downwardly through the openings 46c and 46d in the housing 45, between the rods 43 and 47, the plunger 39 being retracted into the solenoid 37 during this operation as shown in FIG. 7. The plunger 39 may then be permitted to return to its normal position, FIG. 4, wherein it is effective to clamp the lower end portion of the measuring device 24 between the rods 43 and 47, thereby closing the passageway 33 at that point. The tank 22 may then be filled with the liquid to be dispensed, and the liquid will flow downwardly through the upper end portion 33a and the restricted portion 33c of the passageway 33 into that portion of the lower end portion 33b disposed above the rods 43 and 47, to fill the measuring device 24 above the rods 43 and 47, as shown in FIG. 6. That portion of the passageway 33 disposed between the restriction 35 and the rods 43 and 47 is of such size that when it is filled as shown in FIG. 6, it holds a supply of liquid substantially in the amount that is desired to be discharged from the dispenser 20 during each cycle of operation thereof.

When it is desired to discharge liquid from the dispenser 20, the solenoid 37 may be actuated to thereby move the plunger 39 into retracted position, as shown in FIG. 7. This, of course, opens the lower end portion of the measuring device 24 for the passage of liquid downwardly therethrough. The lower end portion 33b of the passageway 33 is of relatively large cross section and, therefore, the liquid trapped between the restricted passageway 33c and the bars 43 and 47 is relatively quickly discharged through the lower end of the measuring device 24. During this discharge of the liquid trapped between the restricted passageway 33c and the bars 43 and 47, additional liquid, of course, flows downwardly through the restricted passageway 33c into the lower end portion 33b. However, the lower end portion 33b of the passageway 33 is of considerably larger cross sectional size than the restricted passageway 33c, such as, for example, the lower end portion 33b of the passageway being three-eighths of an inch wide in collapsed position, as compared to a width of one-sixteenth of an inch in the restricted portion 33c in collapsed position. Hence, it will be seen that a relatively small amount of liquid flows downwardly through the restricted passageway 33c into the lower end portion 33b of the passageway 33 during the interval of time necessary for the complete emptying of the aforementioned trapped liquid downwardly through the lower end of the measuring device 24. I prefer to limit the flow of liquid downwardly through the restricted passageway 33c, during discharge of the trapped liquid, to not more than ten percent to twenty percent of the aforementioned trapped liquid.

After the interval of time necessary for the discharge of the aforementioned trapped liquid, the solenoid 37 may be de-energized by suitable controls, not shown, to thereby again move the plunger 39 outwardly into position wherein the lower end portion of the measuring device 24 is clampingly engaged between the rods 43 and 47. When this occurs, the liquid continues to flow downwardly through the restricted passageway 33c until the passageway 33 is again filled with liquid between the restricted passageway 33c and the rods 43 and 47, at which time a new cycle of operation may be initiated by again energizing the solenoid 37 if it is desired to do so.

It will be seen that my dispenser 20 affords a novel, practical and efficient dispenser for cream, milk, beverage syrups, and the like.

Also, it will be seen that my novel measuring device 24 affords an effective and efficient discharge conduit, which may be quickly and easily mounted on and removed from a suitable storage tank or receptacle, such as the tank 22 and which may be used either as a disposable or reusable item.

In addition, it will be seen that it affords a novel discharge conduit and measuring device, the sterile condition of which may be readily insured.

In the modified form of my invention shown in FIGS. 9 to 12, inclusive, parts shown therein, which are the same as parts shown in FIGS. 1 to 8, inclusive, are indicated by the same reference numerals, and parts which are similar to parts which are shown in FIGS. 1 to 8, inclusive, are indicated by the same reference numerals with the prefix "1" added thereto.

In the modified form of dispenser 120 shown in FIGS. 9 to 12, inclusive, a combination discharge conduit and measuring device 124 is mounted on the outlet nipple 28 of a tank 22, with the lower end portion of the measuring device 124 extending between the rods 43 and 47 of the control device 26.

The measuring device 124 preferably includes a tubular shaped member 51 which may be made of a suitable thermoplastic material, such as, for example, thermoplastic resinous material such as polyethylene resin, or the like. The tubular member 51 is preferably sufficiently flexible that the walls thereof may be readily collapsed to thereby close the passageway 133 therethrough, but preferably has sufficient body that it is semi-rigid, that is, it is sufficiently rigid that it is self-supporting and, when not collapsed by externally applied forces, is round in cross section throughout most of its length, FIG. 11.

Like the measuring device 24, the upper and lower end portions 133a and 133b of the passageway 133 are preferably equal in size and relatively large in cross section and are connected by a restricted passageway 133c, the restriction 135 in the passageway 133 being afforded by heat sealing the walls of the tubular member 51 together for a distance inwardly from the longitudinal edges thereof in the same manner as heretofore discussed with respect to the measuring device 24.

Two openings 53 and 54, which are substantially the same in cross section as the lower end portion 133b of the passageway 133, are formed in one side of the tubular member 51 in spaced relation to each other, FIG. 9. A hollow container 55, preferably in the form of a bag having an open end and formed of suitable sheet material such as the aforementioned polyethylene resin, is mounted on the tubular member 51 with the marginal edge portion of the open end thereof sealed to the tubular member 51 in enclosing relation to both of the openings 53 and 54. The sealing of the container 55 to the tubular member 51 may be accomplished by suitable means, such as, for example, heat sealing.

In the manufacture of the measuring device 124, after the tubular member 51 has been formed and the container 55 has been secured thereto, the interior of the measuring device 124 may be sterilized and the opposite ends 57 and 58 thereof may be heat sealed together to thereby hermetically seal the measuring device 124 and insure that the interior thereof shall remain sterile.

When my novel measuring device 124 is to be installed in a vending machine, or the like, the end portions thereof may be cut off inwardly of the sealed ends 57 and 58 by means of a scissors, knife, or the like, and the upper end portions may then be immediately mounted in position on the outlet nipple 28 of the tank 22 to which the device is to be attached. The lower end portion of the measuring device 124 may then be inserted between the rods 43 and 47 of the control device in the manner heretofore described with respect to the measuring device 24.

If desired, the measuring device 124 may be installed on the tank 22 at the dairy, or the like, and the lower end thereof kept sealed at edge 58 until the tank is installed in a vending machine, as previously discussed in connection with the measuring device 24, shown in FIGS. 1 to 8.

In the operation of my novel measuring device 124, when the rods 43 and 47 are disposed in position to closingly clamp the lower end portion of the measuring device 124 and the upper end portion of the measuring device 124 is disposed on the outlet nipple 28 of the tank 22, the tank 22 may then be filled with liquid. The liquid will then flow downwardly through the outlet nipple 28 to fill the measuring device 124 above the rods 43 and 47. It will be noted that in this filling operation, both the tubular member 51 above the rods 43 and 47 and the container 55 are filled. The filling of the container 55 is effected by the flow of liquid from the tubular member 51 inwardly through the opening 53 or 54, or both of them, into the container 55.

When the solenoid 37 is energized to thereby separate the rods 43 and 47, liquid flows quickly through the relatively large opening afforded by the lower end portion 133b of the passageway 133, to thereby relatively quickly discharge the liquid trapped in the passageway 133, below the restricted passageway 133c, outwardly through the lower end of the tubular member 51. At the same time, the liquid trapped in the container 55 flows relatively quickly outwardly through the openings 53 and 54 and the lower end portion 133b of the passageway 133 so that it also is quickly discharged from the tubular member 51. In this instance, again, the flow of liquid through the restricted passageway 133c is so slow as to be relatively negligible during the short interval of time required to empty the trapped liquid in the lower end portion of the passageway 133 and the container 55. When the trapped liquid is thus discharged from the tubular member 51, the solenoid may again be de-energized to thereby clamp the lower end portion of the tubular member 51 between the rods 43 and 47 and again close the lower end of the passageway 133. When this occurs, the liquid flowing through the restricted passageway 133c may again fill the passageway 133 between the restricted passageway 133c and the rods 43 and 47, and also fill the container 55, in preparation for the next discharge cycle of operation.

It will be appreciated by those skilled in the art that, if it is desired to do so, in order to decrease the time necessary to discharge the trapped liquid from my novel measuring device 124, the container 55 may be mechanically collapsed inwardly, without departing from the purview of my invention.

It will be seen that my novel dispenser 120 also affords a novel, practical and efficient dispenser for cream, milk, beverage syrups, and the like.

Also, it will be seen that my novel measuring device 124 also affords an effective and efficient discharge conduit, which may be quickly and easily mounted on and removed from a suitable storage tank or receptacle, such as the tank 22, and which may be used either as a disposable or reusable item.

In addition, it will be seen that it affords a novel discharge conduit and measuring device, the sterile condition of which may be readily insured.

In the modified form of my invention shown in FIG. 13, parts which are like the parts shown in FIGS. 1 to 8, inclusive, are indicated by the same reference numerals, and parts which are similar to those shown in FIGS. 1 to 8, inclusive, are indicated by the same reference numerals with the prefix "2" added thereto.

In FIG. 13, a dispenser 220 is shown which includes a measuring device 224 which is identical to the measuring device 24 shown in FIGS. 1 to 7, inclusive, except that the sheets 24a and 24b thereof have enlarged extensions 71 and 72 on the upper end portions thereof, respectively. The extensions 71 and 72 are integral with the sheets 24a and 24b, respectively, and are preferably made from the same sheet of material as each of the sheets 24a and 24b.

The sheets 71–24a and 72–24b are preferably substantially L-shaped and are disposed in juxtaposition to each other. The portions 71 and 72 of these sheets are heat sealed together along their opposite side edges 74 and 75, respectively, and along the bottom edge 76 from the lower end of the side edge 75 to a point disposed in spaced relation to the side edge 74. The portions 24a and 24b project downwardly from the unsealed portion of the bottom edge 76 of the portions 71 and 72, and, like the sheets 24a and 24b of the measuring device 24, are heat sealed together along their marginal edges 30 and 31. The passageway 33 through the measuring device 124 also has an upper end portion 33a and a lower end portion 33b which are preferably of the same relatively large cross sectional size and are connected together by a restricted portion 33c of the passageway, the restriction 35 being afforded by heat sealing the sheets 24a and 24b together inwardly from the longitudinal edge portions 30 and 31 thereof.

With this device the portions 71 and 72 of the sheets 71–24a and 72–24b afford the receptacle or tank 222 for the dispenser 220. In the manufacture of the modified form of my invention, the upper edge portions of the sheet portions 71 and 72 are originally not sealed together, and the lower end edges of the measuring device 124 may be heat sealed together in a manner similar to that shown in FIG. 5 at 49. After the manufacture of the combination receptacle and measuring device shown in FIG. 13, it may be sterilized and then filled with milk, cream, or the like. Thereafter, the upper edge portions of the sheets 71 and 72 may be heat sealed together such as, for example, along the upper edge 78 and a line 79 disposed in parallel spaced relation thereto. Openings 81 may be formed through the sheet material between the sealed portions 78 and 79 so that when my novel dispenser 220 is to be used in a vending machine, it may be hung on suitable hooks or the like, not shown, positioned in the machine, and the lower end portion of the measuring device 124 may be inserted downwardly through the housing 45 of the control device 26 between the rods 43 and 47 as previously explained in connection with the measuring device 24 as shown in FIGS. 1 to 8, inclusive. After the rods 43 and 47 have been disposed in clamping engagement with the lower end portion of the measuring device 24, the sealed lower end portion of the measuring device 124 may be cut therefrom below the housing 45 to thereby open the end of the measuring device 124.

In the operation of the novel form of my invention shown in FIG. 13, the cream, or the like, may flow downwardly from the tank 222 through the opening in the lower edge 76 between the sheet portions 71 and 72 into the passageway 33 in the measuring device 124. Energization and de-energization of the solenoid 37 is effective, as in the operation of the dispenser 20, to alternately discharge the trapped cream in the passageway 33 below the restricted passageway 33c in the measuring device 124, and permit the portion of the passageway 33 between the restricted passageway 33c and the rods 43 and 47 to refill with liquid.

It will be seen that the modified form of my invention shown in FIG. 13 affords a self-contained storage tank and measuring device for cream, or the like, which may be quickly and easily mounted in vending machines, and the like, and which affords a practical, novel sanitary receptacle in which to transport cream, or the like, from the source of supply to the vending machine, or the like, in which it is to be used.

In the modified form of my invention shown in FIGS. 14 and 15, parts which are similar to those shown in FIGS. 1 to 8, inclusive, are indicated by the same reference numerals with the prefix "3" added thereto.

In FIGS. 14 and 15, a measuring device 324 is shown which is similar, in many respects, to the measuring device 124 shown in FIGS. 9 to 12, inclusive. The measuring device 324 preferably includes a tubular-shaped member 351 which may be made of a suitable thermoplastic material, such as, for example, thermoplastic resinous materials such as polyethylene resin, and the like. The tubular member 351, like the tubular member 51 of the form of my invention shown in FIGS. 9 to 12, inclusive, is preferably sufficiently flexible that the walls thereof may be readily collapsed to thereby close the passageway 333 therethrough, but preferably has sufficient body that it is semi-rigid, that is, it is sufficiently rigid that it is self-supporting and, when not collapsed by extremely applied forces is round in cross section throughout most of its length.

It will be remembered that the restriction 35 in the measuring device 24 as shown in FIGS. 1 to 8, inclusive, is a partial restriction. In the measuring device 324 shown in FIGS. 14 and 15, no such partial restriction of the passageway 333 is embodied, but, instead, the side walls of the tubular member 351 are heat sealed together to form a complete restriction 91. The restriction 91 is preferably disposed in the same relative position on the measuring device 324 as is the restriction 35 on the measuring device 224.

An opening 354 is formed in the side wall of the tubular member 351, below the restriction 91, and is preferably substantially the same cross sectional size as the passageway 333. Another opening 353 is formed in the side wall of the tubular member 351 above the restriction 91. However, a plug 93 having an opening 93a therethrough, is mounted in the opening 353 to afford a partial restriction. The opening 93a is preferably approximately one-tenth of the cross sectional size of the opening 354.

A hollow container 355, preferably in the form of a bag having an open end and formed of suitable sheet material such as the aforementioned polyethylene resin, is mounted on the tubular member 351 with the marginal edge portion of the open end of the bag sealed to the tubular member 351 in enclosing relation to both of the openings 353 and 354. The sealing of the container 355 to the tubular member 351 may be accomplished by suitable means, such as, for example, heat sealing.

The measuring device 324 may be mounted in a vending machine, or the like, in the same manner as the measuring device 124, with the upper end portion thereof mounted on the outlet nipple of a suitable tank, and with the lower end portion thereof disposed in a suitable control device such as, for example, the aforementioned control device 26.

In the operation of my novel measuring device 324, after the lower end portion thereof has been closed such as, for example, by the aforementoined control device 26, and the tank to which the measuring device 324 is attached has been filled with liquid, the liquid may flow downwardly through the opening 93a, and into the container 355. The liquid may flow from the container 355 through the opening 354 into the lower end portion 333b of the passageway 333 until the lower end portion 333b is filled with the liquid above the control device 26. Thereafter, the liquid will continue to flow through the opening 93a into the container 355 until the container 355 is completely filled.

When the container 355 and the lower end portion of the passageway 333 are completely filled, and the control device 26 is actuated to unclamp the lower end portion of the conduit 351, the liquid trapped in the container 355 and the lower end portion 333b of the passageway 333 flows relatively quickly outwardly through the lower end of the tubular member 351. As in the other forms of my invention hereinbefore described, the flow of liquid inwardly through the opening 93a, during the discharge of the trapped liquid in the lower end portion 333b of the passageway 333 and in the container 355, is substantially negligible. After the trapped liquid has been discharged from the measuring device 324, the control device 326 may again be actuated to close the lower end portion 333b of the passageway 333, and the container 355 and the lower end portion 333b of the passageway 333 may again be filled by a liquid flowing through the opening 93a.

It will be seen that my novel measuring device 324 also affords a novel, practical and efficient dispenser for cream, milk, beverage syrups, and the like.

Also, it will be seen that my novel measuring device 324 also affords an efficient and effective discharge conduit, which may be quickly and easily mounted on and removed from a suitable storage tank or receptacle, and which may be used either as a disposable or reusable item.

From the foregoing, it will be seen that I have afforded a novel measuring device for dispensing liquids such as milk, cream, beverage syrups, and the like.

Also, it will be seen that with dispensers constructed in accordance with the principles of my invention, sanitation in the discharge conduits of such dispensing devices may be insured in a novel and expeditious manner.

Thus, while I have illustrated and described the preferred embodiments of my invention, it is to be understood that these are capable of variation and modification.

I claim:

1. A dispenser for liquids comprising a storage receptacle having a discharge outlet, elongated conduit means for feeding liquid from said outlet, said means comprising an intermediate portion affording a measuring chamber, an inlet end portion connected at one end to said outlet and at the other end to said chamber, and an outlet end portion having one end connected to said chamber for discharging liquid from said chamber, a portion of the sidewalls of said inlet end portion being compressed and sealed together to afford a restriction in said inlet end portion which has an open cross-sectional size which is a small fraction of the open cross-sectional size of said outlet end portion, said outlet end portion being flexible and movable between a fully collapsed position and a fully open position, and means including said outlet end portion for controlling the discharge of liquid from said chamber.

2. A dispenser as defined in claim 1, and in which said conduit means comprises a flexible tubular member the walls of which are normally disposed in juxtaposition to each other when said conduit means are empty.

3. A dispenser as defined in claim 1, and in which said conduit means comprises a semi-rigid elongated tubular member having openings in a side thereof, and a container having an open end, said open end being sealed to said tubular member in enclosing relation to said openings.

4. A dispenser as defined in claim 1, and in which said storage receptacle consists of a bag formed of flexible sheet material, and in which said conduit means is formed of sheet material which is integral with said first mentioned sheet material.

5. A dispenser as defined in claim 1, and in which said conduit means includes an elongated tubular member having a complete restriction between the ends thereof, and in which said tubular member has one opening in one side thereof at one side of said complete restriction, and another opening in said side on the other side of said complete restriction, and in which said first mentioned restriction is disposed in said one opening, and in which said conduit means includes a housing having an open end, said open end being sealed to said tubular member in enclosing relation to said openings.

6. In a dispenser for cream, and the like, a flexible bag having an outlet opening therein, said bag being closed on all sides except at said opening, and an elongated flexible tubular conduit having a discharge end, and another end attached to said bag in communication with said opening, said conduit having a passageway extending longitudinally therethrough, means partially restricting said passageway in spaced relation to said discharge end to a small fraction of the cross-sectional size of said passageway through said discharge end, said conduit having side wall portions disposed between said discharge end and said restricting means in spaced relation to said latter means and movable toward and away from each other into position to close and open said passageway between said restricting means and said discharge end.

References Cited in the file of this patent

UNITED STATES PATENTS

| | | | |
|---|---|---|---|
| 1,392,600 | Rose | Oct. 4, | 1921 |
| 1,471,238 | Burkhard | Oct. 16, | 1923 |
| 1,840,190 | Dyck | Jan. 5, | 1932 |
| 2,647,661 | Harvey | Aug. 4, | 1953 |
| 2,763,011 | Rood et al. | Mar. 23, | 1954 |
| 2,869,761 | Meyer et al. | Jan. 20, | 1959 |
| 2,907,495 | Brous | Oct. 6, | 1959 |